United States Patent
Globensky et al.

(10) Patent No.: US 6,511,573 B1
(45) Date of Patent: Jan. 28, 2003

(54) MACHINES FOR FORMING TUBULAR CONTAINERS

(75) Inventors: Richard L. Globensky, Anoka, MN (US); Frederick J. Fisher, Forest Lake, MN (US); Michael Afremov, St. Louis Park, MN (US); Brian Packard, Monticello, MN (US)

(73) Assignee: Minnesota Medical Development, Inc., Maple Grove, MN (US)

( * ) Notice: Subject to any disclaimer, the term of this patent is extended or adjusted under 35 U.S.C. 154(b) by 282 days.

(21) Appl. No.: 09/580,108

(22) Filed: May 30, 2000

(51) Int. Cl.[7] .................................................. B32B 7/14
(52) U.S. Cl. ........................ 156/291; 156/245; 206/389; 242/173
(58) Field of Search ..................... 156/291, 242, 156/245; 428/906; 242/173, 160.1, 536, 915; 206/397, 389, 53–55

(56) References Cited

U.S. PATENT DOCUMENTS

| | | | | |
|---|---|---|---|---|
| 2,780,352 A | * | 2/1957 | Schroeder | 206/389 |
| 3,127,012 A | * | 3/1964 | Smoot | 206/389 |
| 4,276,333 A | * | 6/1981 | Cobean | 156/291 |
| 4,572,370 A | * | 2/1986 | Cedenblad et al. | 206/53 |
| 4,607,746 A | | 8/1986 | Stinnette | 206/53 |
| 5,525,178 A | | 6/1996 | Roggenbuck | 156/244.13 |

* cited by examiner

Primary Examiner—Geoffrey L. Knable
(74) Attorney, Agent, or Firm—Nikolai & Mersereau, P.A.

(57) ABSTRACT

A coil of tubing can have either adjacent tubes or tubes with a space therebetween. To hold the tubes in place a material such as an adhesive can be placed across the top of the coil, on the bottom of the coil or both to hold the coil in place. The material can also envelope the coils such that the coils are banded. The coils may have a length of a straight portion of tubing prior to the coil beginning and an angled portion on the inside diameter for inserting or extracting a product in the tubing which may be similarly retained. The tubing may be coiled by insertion between two templates. The templates have injection ports for inserting material to hold or encase the tubing. Thus the tubing may be inserted in the templates, a material to hold the tubing in the coiled position inserted and the coiled tubing removed from the templates ready for use in their coiled position with the material on the tubing holding the tubing in the coiled position.

31 Claims, 18 Drawing Sheets

MACHINES FOR FORMING TUBULAR CONTAINERS

BACKGROUND OF THE INVENTION

1. Field of the Invention

This invention relates to packaging and more particularly to securing tubing in a coil with an adhesive material.

2. Description of the Related Art

In the past when a coil of tubing was to be stored in a coil, one tube was secured to the next by a band around the coiled tubing, such as twist ties, tape, frames, or other devices surrounding the entire coil. A coil of tubes has also been secured by one tube having a concave member and the adjacent tube having a convex member for fitting into the concave member. Coils of tubes have also been connected by adhesives placed on the outside of the tubes such that tangent tube portions are glued together. It is difficult to apply an adhesive to a tube and then coil it with tangential portions glued together since the tangent space is a line which does not offer much surface area. At least one design called for a flattened tangential portion to provide for a larger surface area but the tube is then not round. There are no tubes secured together adhesively with the adhesive applied radially across the coiled tubes on one side of the coil.

There is a further need for a coiled tube to have an angled end portion for easy attachment of objects on the end of the tubing.

SUMMARY OF THE INVENTION

A coil of tubing is wound with tangential portions of the tubing adjacent in a template having a top half with a coiled trough and a bottom half with a coiled trough such that when the tubing is inserted into the template and pushed forward the template guides the tubing in a spiral such that it is coiled. The two templates may be slightly spaced during the tube insertion for ease of inserting the tube. When the template is filled with tubing the templates are moved together to firmly hold the coiled tubing in place and an adhesive is injected through the bottom template across the top of the coiled tubing to form tabs of adhesive which semicircularly surround the tubes and fill in the gaps therebetween and extending slightly above the tubes to secure the tubes to one another. When the tubes are so secured, the template is opened and the coiled tube is removed. The template halves are then ready to admit another section of tubing to be secured in a coil.

In a second embodiment the tubing is inserted in the templates as before but the adhesive is injected on both sides of the tubing semi circularly surrounding the tubes.

In a third embodiment the tubing is banded by totally surrounding the tubes.

In a fourth embodiment the tubing has an angled portion on the inner diameter to facilitate placing a lure in the end of the tubing. The angled portion of the template forces the tubing to angle away from the coil and then heat-treats the tubing so that it remains angled after release from the template.

In a fifth embodiment adhesive fills the gap between the inner diameter and the angled portion thus holding the angled portion in place.

In a sixth embodiment adhesive fills the gap between the inner diameter and the angled portion thus holding the angled portion in place as well as holding the angled portion near the beginning of the tubing.

In a seventh embodiment the tubing is spaced such that adhesive fills the area between the tubing for a larger surface area and better bond of adhesive to the tubing.

OBJECTS OF THE INVENTION

It is an object of the invention to secure a coil of tubing such that it will not uncoil by adhesively connecting the windings in the coil to each other.

It is an object of the invention to quickly and easily coil a length of tubing.

It is an object of the invention to use a small amount of adhesive to secure the coil.

It is an object of the invention to coil the tubing and secure the coil in the same template providing a one step process of coiling and securing the coil.

It is an object of the invention to quickly coil and secure the tubing.

It is an object of the invention to secure the coiled tubing in a low cost manner using a small amount of adhesive on one half of the tubing surface area.

It is an object of the invention to quickly and easily remove the adhesively bound coil from the templates.

It is a further object of the invention for the template to provide an angled portion of tubing on the inside of the coil to attach objects to the coil without interference from the rest of the coil.

It is still a further object of the invention to heat treat the tubing in the template to relieves stress in the angled portion such that the tubing maintains its angled shape on removal from the templates.

It is an object to provide adhesive for securing tubes on one side of the coil of tubes.

It is an object to provide adhesive for securing tubes on both sides of the coil of tubes.

It is also an object of the invention to provide a band of adhesive around the tubing for holding the tubing together.

It is an object of the invention to secure the tubes from uncoiling at the angled portion where the tubes join the coil.

It is an object of the invention to coil the tubes with a gap between the tubes for securing the tubing with adhesive totally surrounding the tubes.

Other objects, advantages and novel features of the present invention will become apparent from the following detailed description of the invention when considered in conjunction with the accompanying drawing.

Description of the Preferred Embodiments

Figure 1:
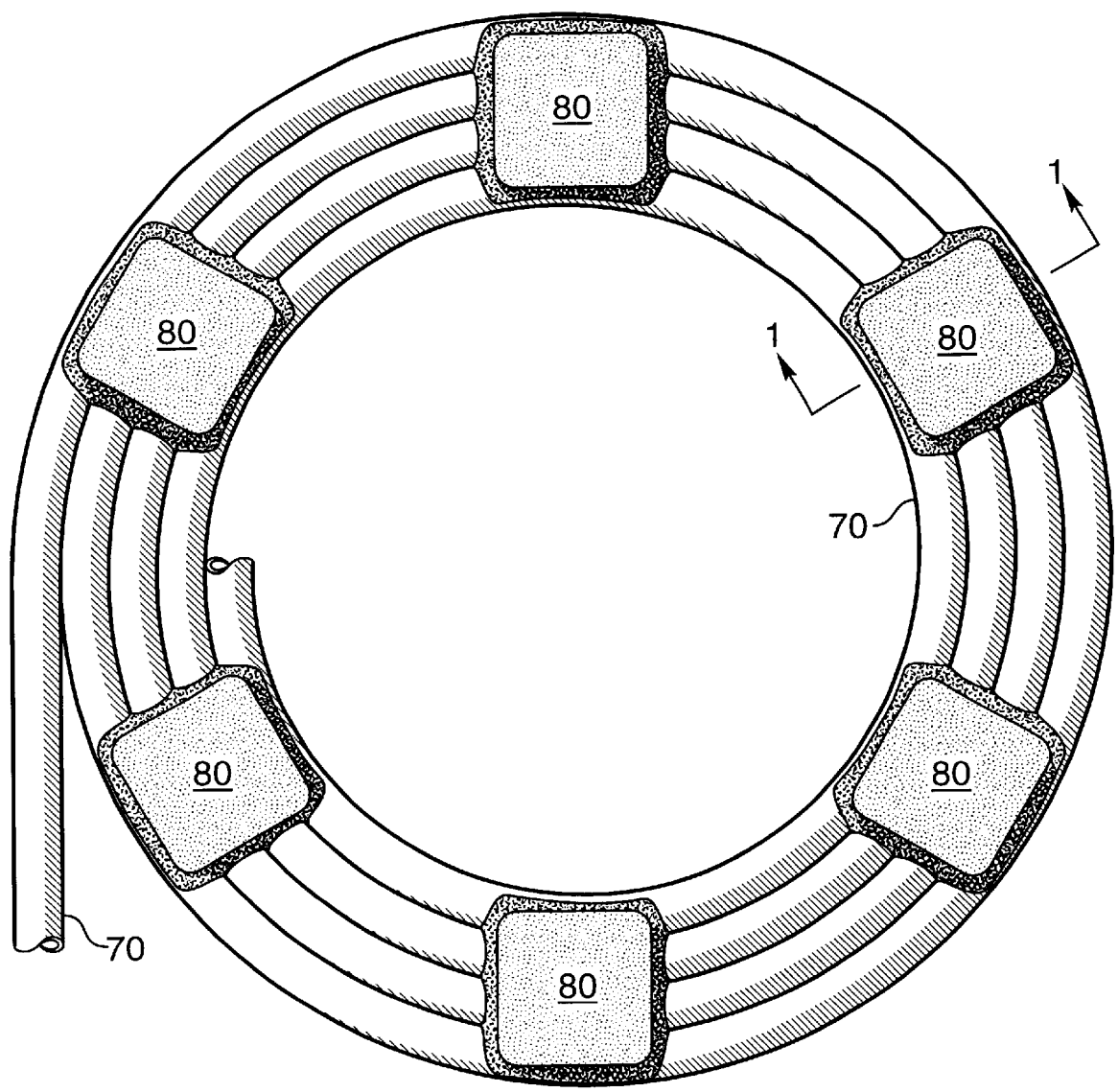
FIG. 1 is a top view of a tube coil held together by adhesive tabs.
Figure 2:
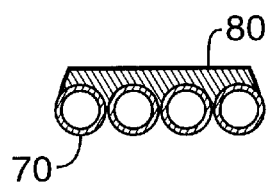
FIG. 2 is a cross section of a tube coil held together by adhesive tabs taken along the line 1—1 of FIG. 1.

FIG. 1 shows a coil of plastic tubing 70 held together with adhesive tabs 80. FIG. 2 shows a cross section along lines 1—1 of FIG. 1 showing the adhesive tabs 80 holding the tubes 70. The adhesive tabs 80 are on the one side of the coil of tubes 70 and cover one half of the diameter of the tubes 70, penetrating to where the tubes are tangentially adjacent, such that a large bonding area of adhesive holds the tubes 70 in the coil.

Figure 3A:
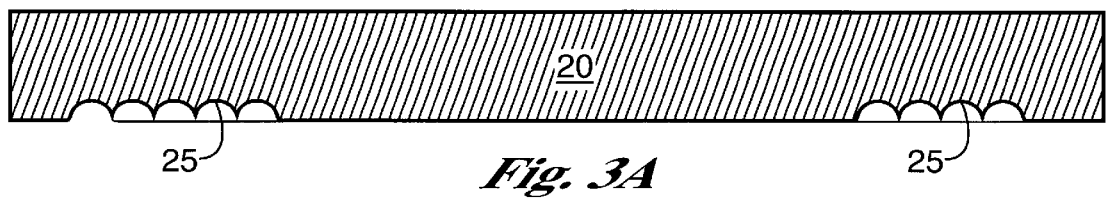
FIG. 3A is a cross sectional view of the top template.
Figure 3B:
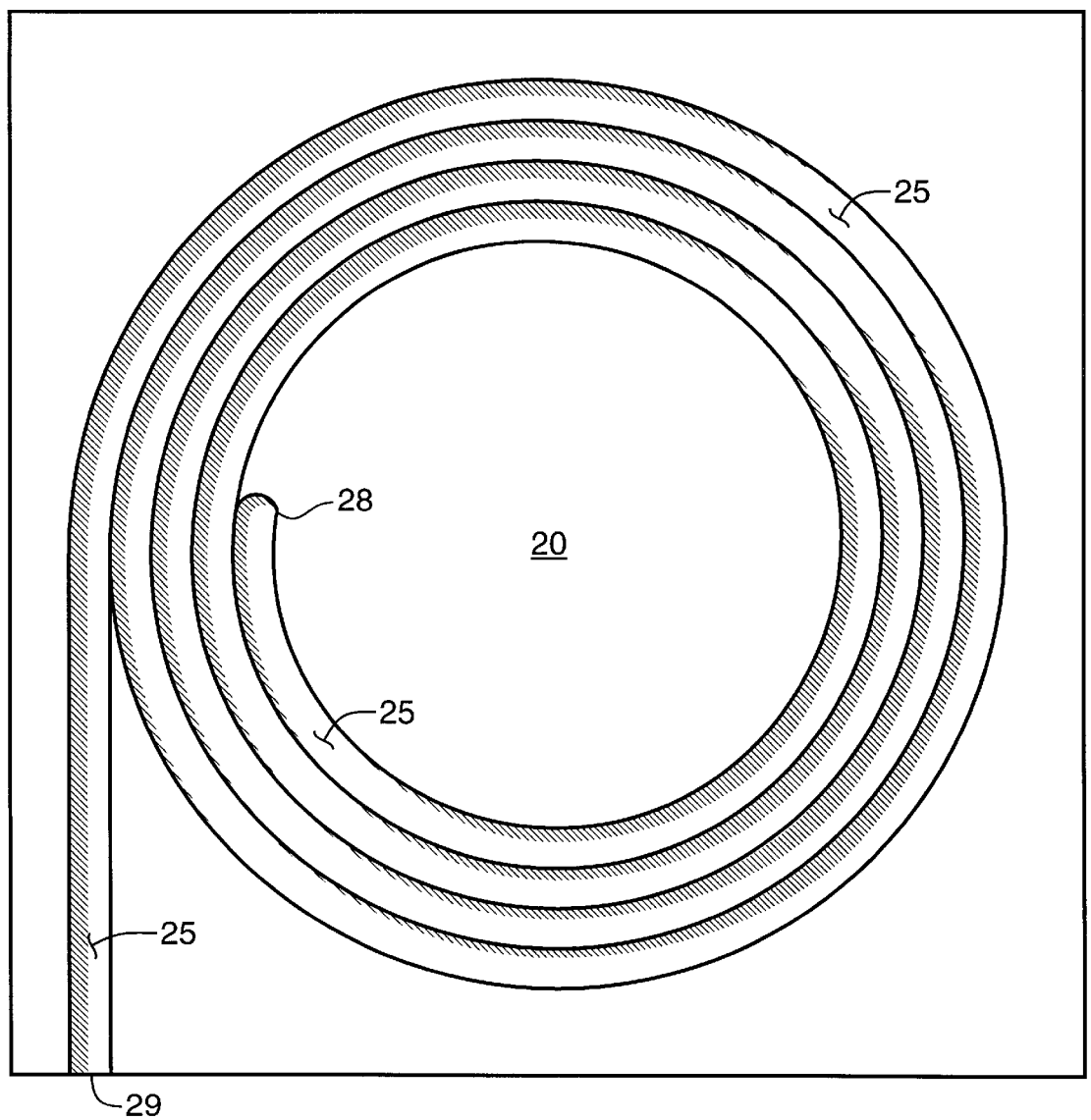
FIG. 3B is a plan view of the top template.
Figure 4A:
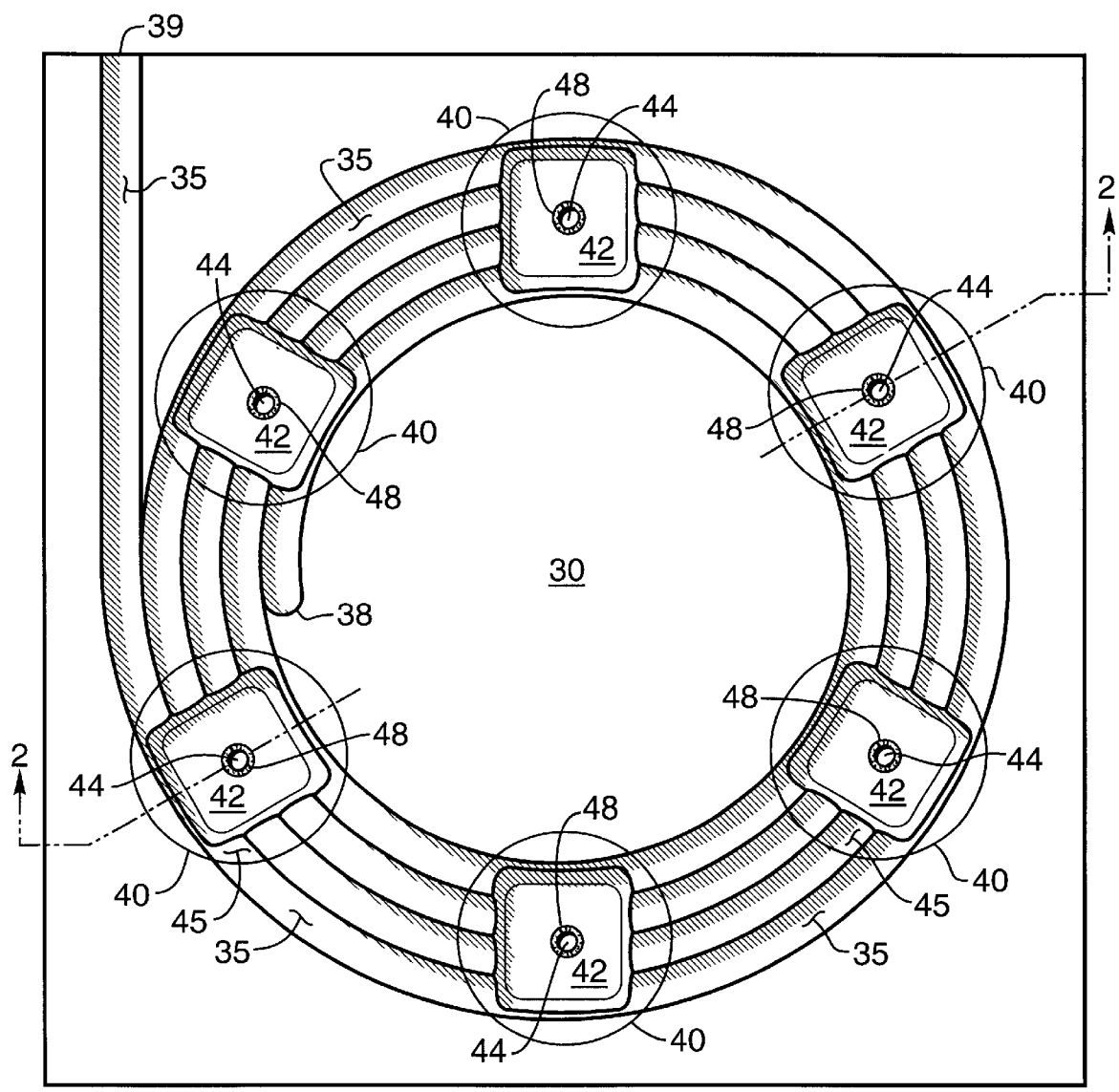
FIG. 4A is a plan view of the bottom template.
Figure 4B:
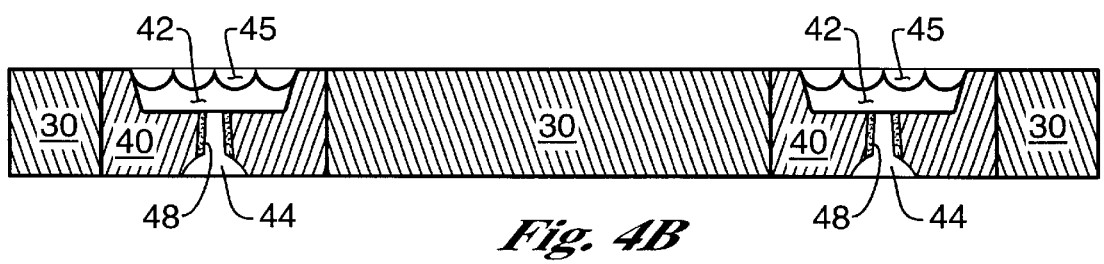
FIG. 4B is a cross sectional view of the bottom template along line 2—2 of FIG. 4A.

FIGS. 3A and 3B show a top template 20 used to coil the plastic tubing 70. FIGS. 4A and 4B show the bottom template 30 used in conjunction with the top template 20 to coil the tubing. The spiral trough 25 of the top template 20 and the spiral trough 35 of the bottom template 30 are mirror images of each other. As can be seen, when the plastic tubing 70 is inserted at 29, 39 the templates 20, 30 will guide the tubing in the spiral troughs 25, 35 until it reaches the trough ending 28, 38. The tubing 70 is now at the desired length and coiled at the desired diameter. The tubing may be precut to length or cut at the end of the templates 20, 30. When the templates 20, are held apart by a small distance the tubing 70 may be more easily threaded through the templates 20, 30. Although four turns of the tubing are shown any number of turns of the coil may be used. When the tubing 70 reaches spiral trough ends 28, 38 the top plate 20 and the bottom plate 30 can be moved into contact with each other to firmly hold the tubes 70 in place. Adhesive can be then be injected through adhesive ports 44 to form the adhesive tabs 80 around a portion of the tubes 70.

FIG. 4A shows the adhesive injectors 40 spaced around the spiral troughs 35. Although six adhesive injectors 40 are shown here any number may be used so long as the number of adhesive tabs 80 applied will hold the coil of plastic tubing 70 together.

Figure 5:
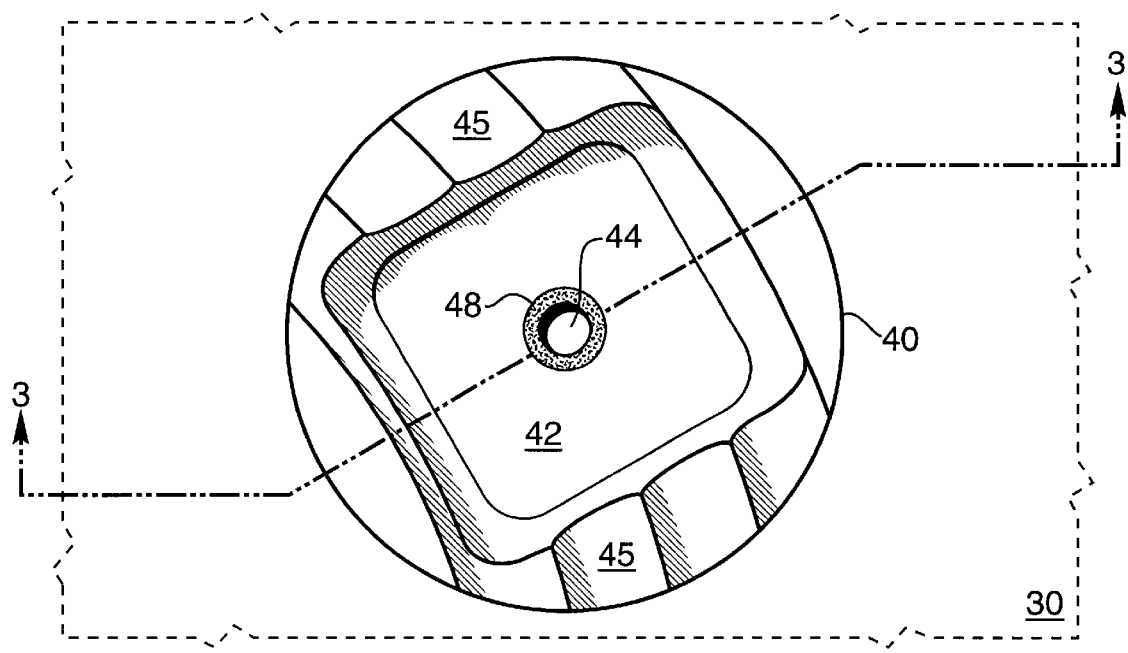
FIG. 5 is a top view of the adhesive injector.
Figure 6:
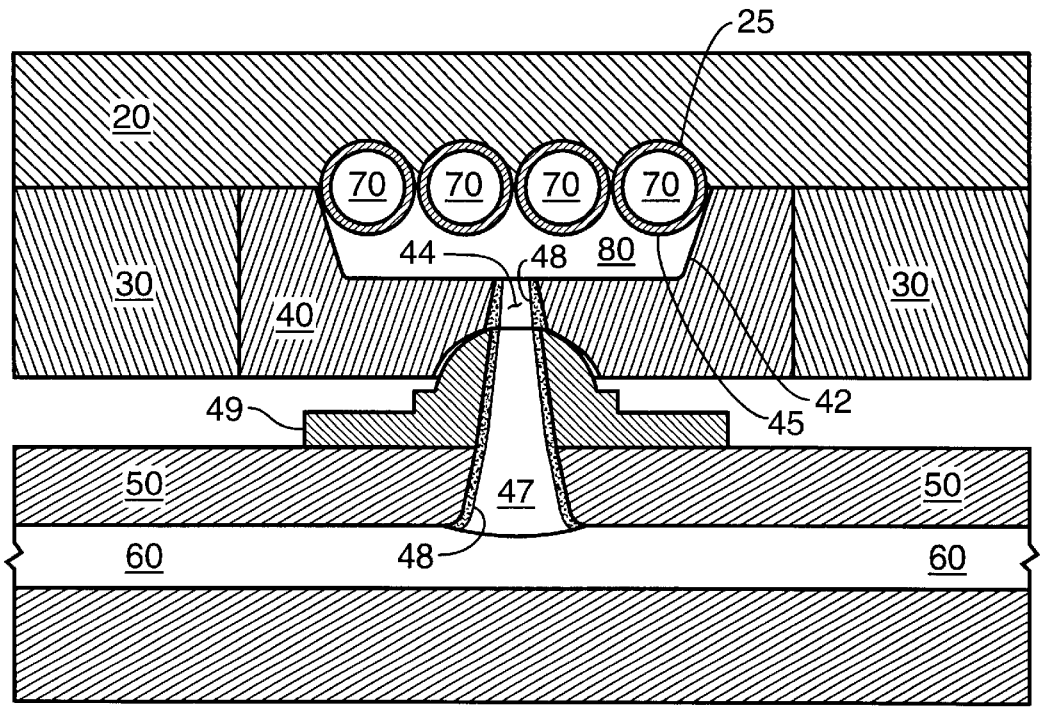
FIG. 6 is a side cross section of the adhesive injector along line 3—3 of FIG. 5 in conjunction with the top template and bottom template.

The adhesive injectors 40 are shown in greater detail in FIGS. 4B, 5 and 6. FIG. 5 shows a top view of the adhesive injectors 40 wherein the spiral trough 45 is continued as in trough 35 so as to guide the tubes 70 through the template 30. The adhesive tab cavity 42 is shown for injecting an adhesive adjacent one half of the circumference of the adjacent tubes 70 for securing the tubes 70 to one another. The adhesive 80 is injected into adhesive tab cavity 42 through port 44.

FIG. 6 shows a cross sectional side view of the adhesive injector 40 along line 3—3 of FIG. 5 and a portion of adjacent top plate 20, bottom plate 30, adhesive reservoir plate 50 and adhesive reservoir 60. Adhesive from the adhesive reservoir 60 can be pressurized or pumped to flow through adhesive passage 47 to adhesive port 44 and injected into adhesive tab cavity 42 to bond tubes 70 as shown in FIGS. 1 and 2.

The adhesive can be a polypropylene adhesive material with a low melting point compared to the plastic tubing 70. A heater for adhesive reservoir 60 may be required to keep the adhesive in reservoir 60 in a liquid state until it is injected into adhesive tab cavity 42. The top template 20 and the bottom template 30 when made of a metal such as aluminum act as heat sinks and carry way the heat of the adhesive material 80 to help the adhesive material 80 harden faster.

When the adhesive material 80 has cooled sufficiently to hold the coiled tubing 70 the templates 20 and 30 are separated and the coiled tubing 70 with the adhesive tabs 80 thereon are removed from the templates 20, 30. The templates 20, 30 are then placed proximate each other and are ready to receive more tubing 70 to be held in a coiled position by adhesive tabs 80.

An insulation material 48 such as Teflon® is preferably used to line the adhesive passage 47 and the adhesive port 44 such that the hot adhesive passing therethrough is insulated from the heat sink of the templates 20 and 30 which tend to cool the adhesive and clog the adhesive port 44 and the adhesive passage 47 during dwell times between injections.

Figure 7:
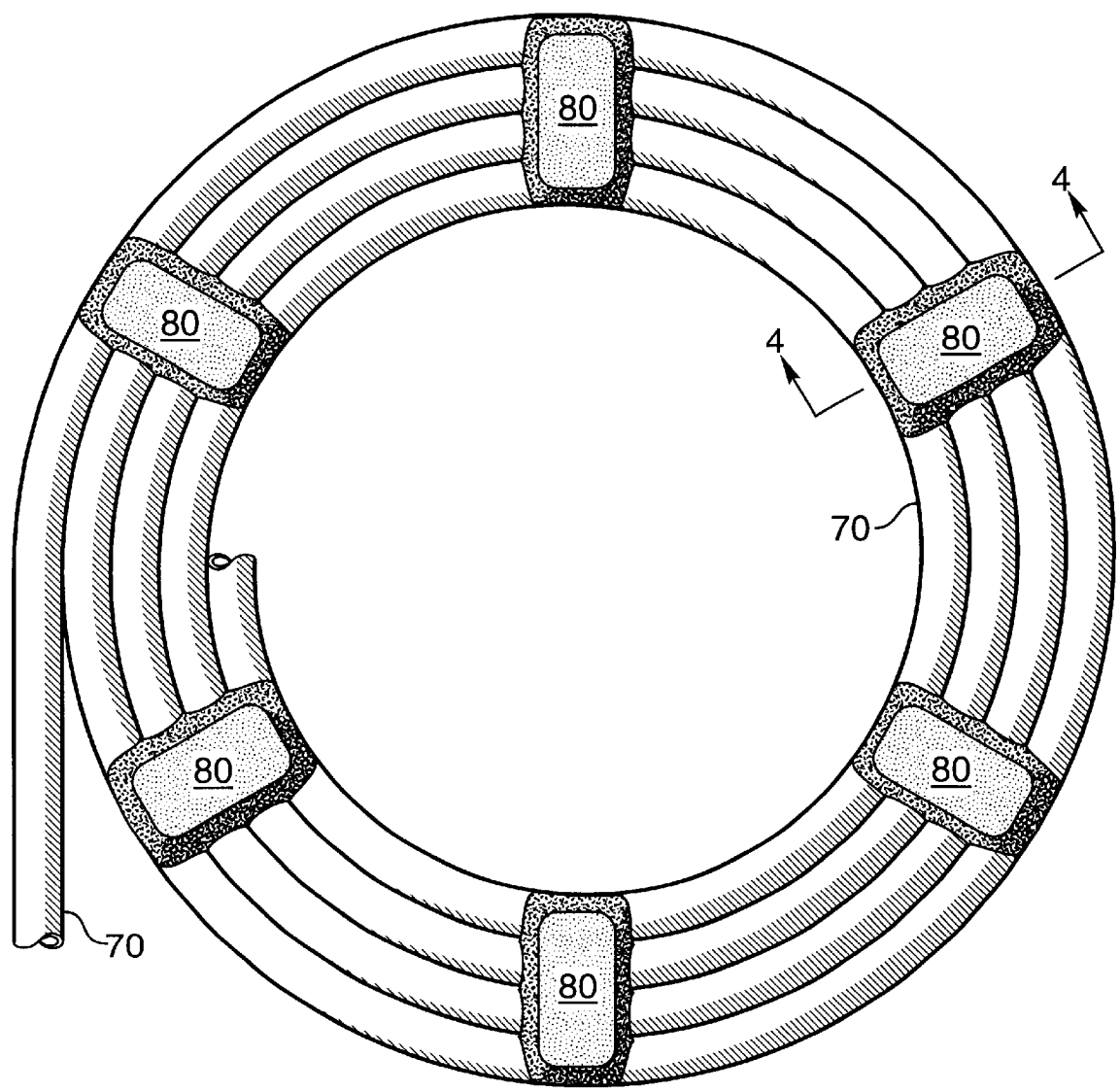
FIG. 7 is a bottom view of a tube coil held together by adhesive tabs on the top and bottom of the coil.
Figure 8:
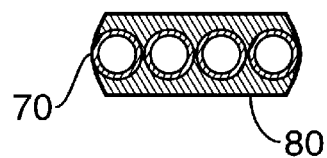
FIG. 8 is a cross section of a tube coil held together by adhesive tabs on the top and bottom of the coil taken along the line 4—4 of FIG. 7.

In another embodiment, shown in FIGS. 7 and 8 the adhesive tabs 80 are placed on the top of the coil of tubes 70 and simultaneously placed on the bottom of the coil as best seen in FIG. 8. FIG. 7 shows the width of the adhesive tabs as about half the width as shown in FIG. 1. Since both sides of the tubing 70 are secured the tabs 80 do not need to be as wide. Thus the tubes are held with about the same amount of adhesive but being secured on two sides helps prevent separation of the coil on what would otherwise be an unsecured side.

Figure 9A:
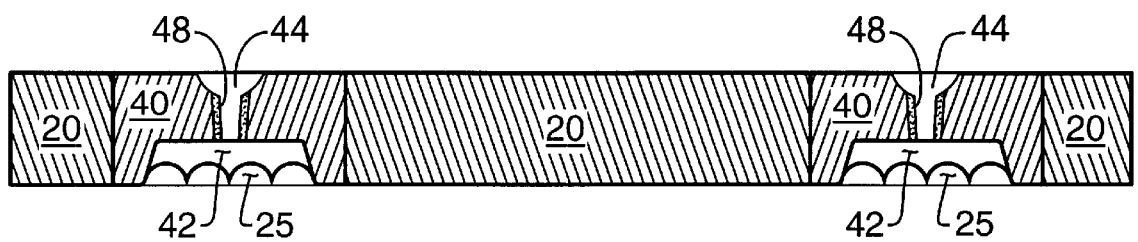
FIG. 9A is a cross sectional view of the top template showing
Figure 9B:
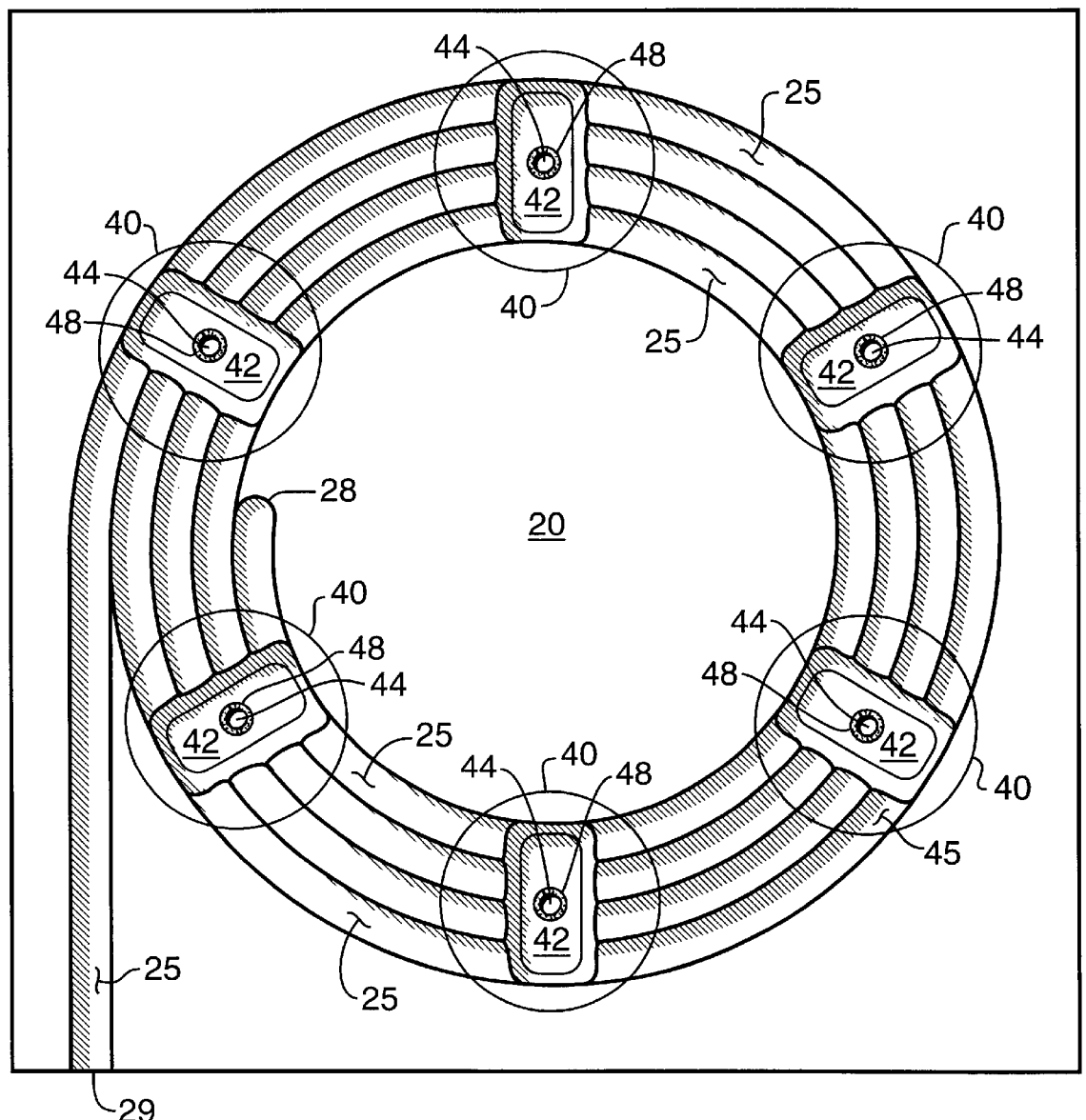
FIG. 9B is a plan view of the top template.
Figure 10A:
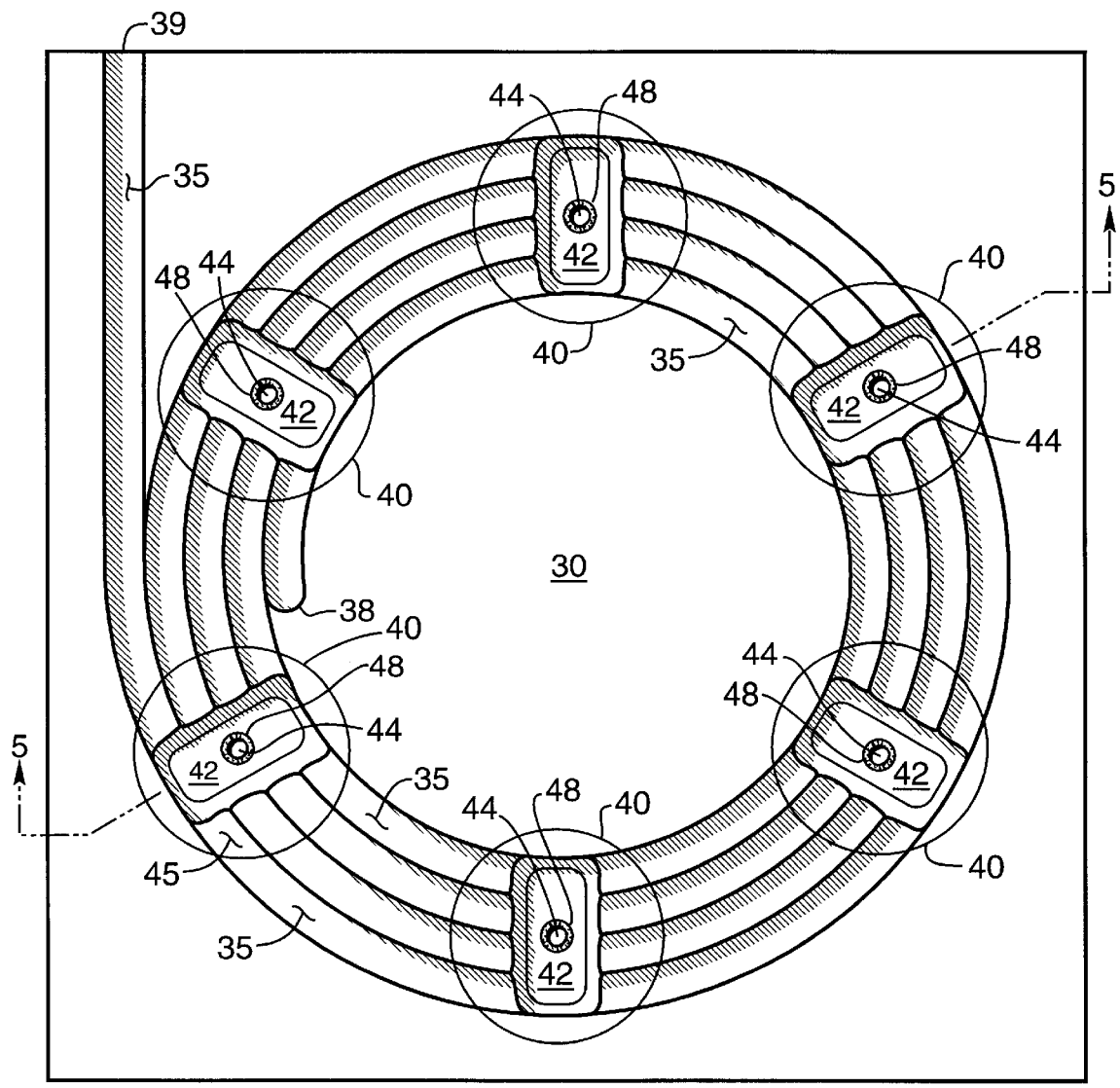
FIG. 10A is a plan view of the bottom template.
Figure 10B:
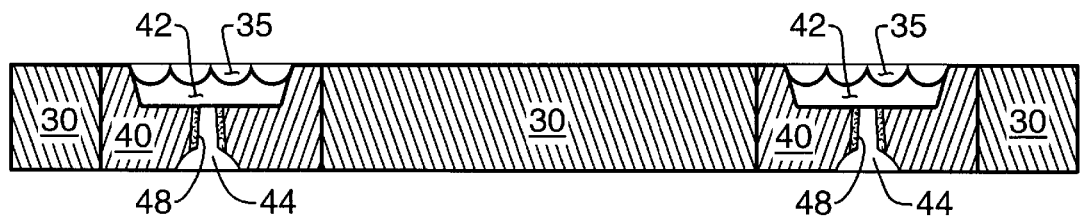
FIG. 10B is a cross sectional view of the bottom template.
Figure 11:
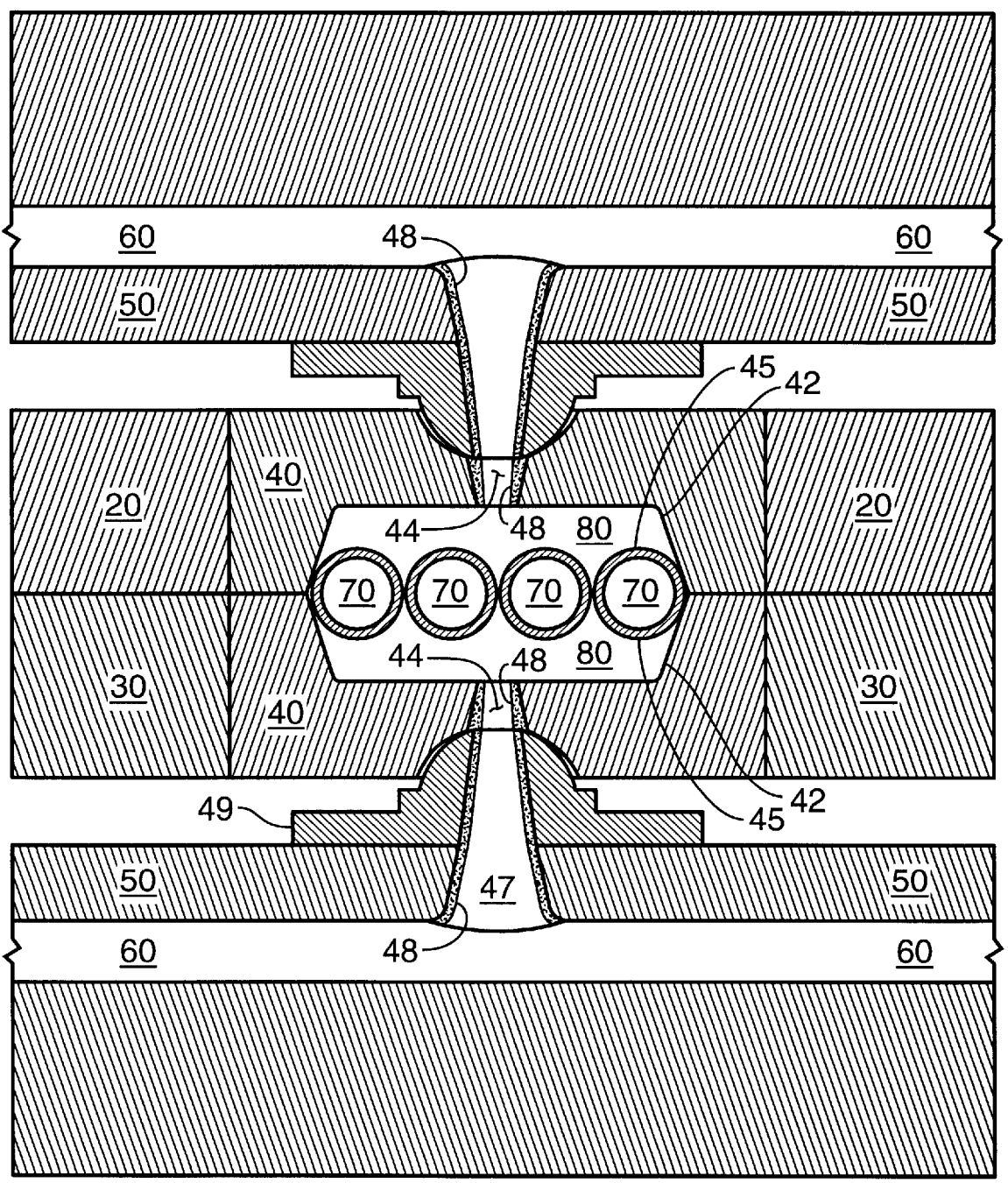
FIG. 11 is a side cross section of the adhesive injector along line 5—5 of FIG. 10A in conjunction with the top template and bottom template.

FIGS. 9A and 9B show the top plate 20 and the associated adhesive injectors 40 for placing tabs 80 on top of the coil of tubing 70. FIGS. 10A and 10B show the bottom plate 30 and the associated adhesive injectors 40 for placing tabs 80 on bottom of the coil of tubing 70. FIG. 11 shows a cross section of the top plate 20 with adhesive injectors 40 and bottom plate 30 with adhesive injectors 40 for injecting adhesive tabs 80 on the top and bottom of the coil of tubing 70 simultaneously.

Figure 12:
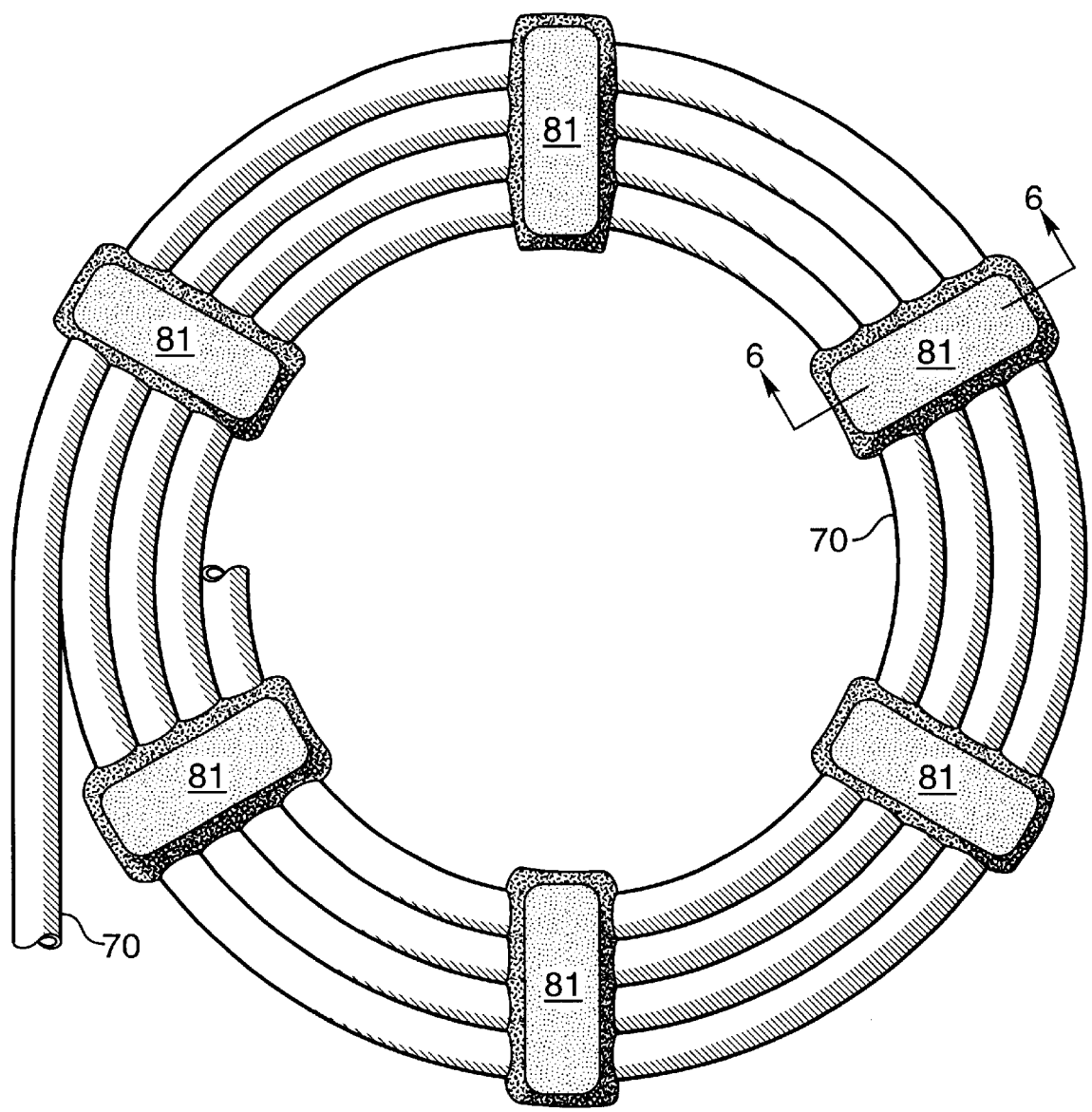
FIG. 12 is a bottom view of a tube coil held together by adhesive bands around the coil.
Figure 13:
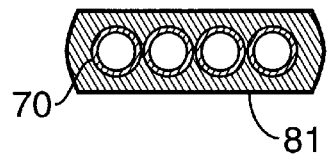
FIG. 13 is a cross section of a tube coil held together by adhesive bands around the top and bottom of the coil taken along the line 6—6 of FIG. 12.
Figure 14:
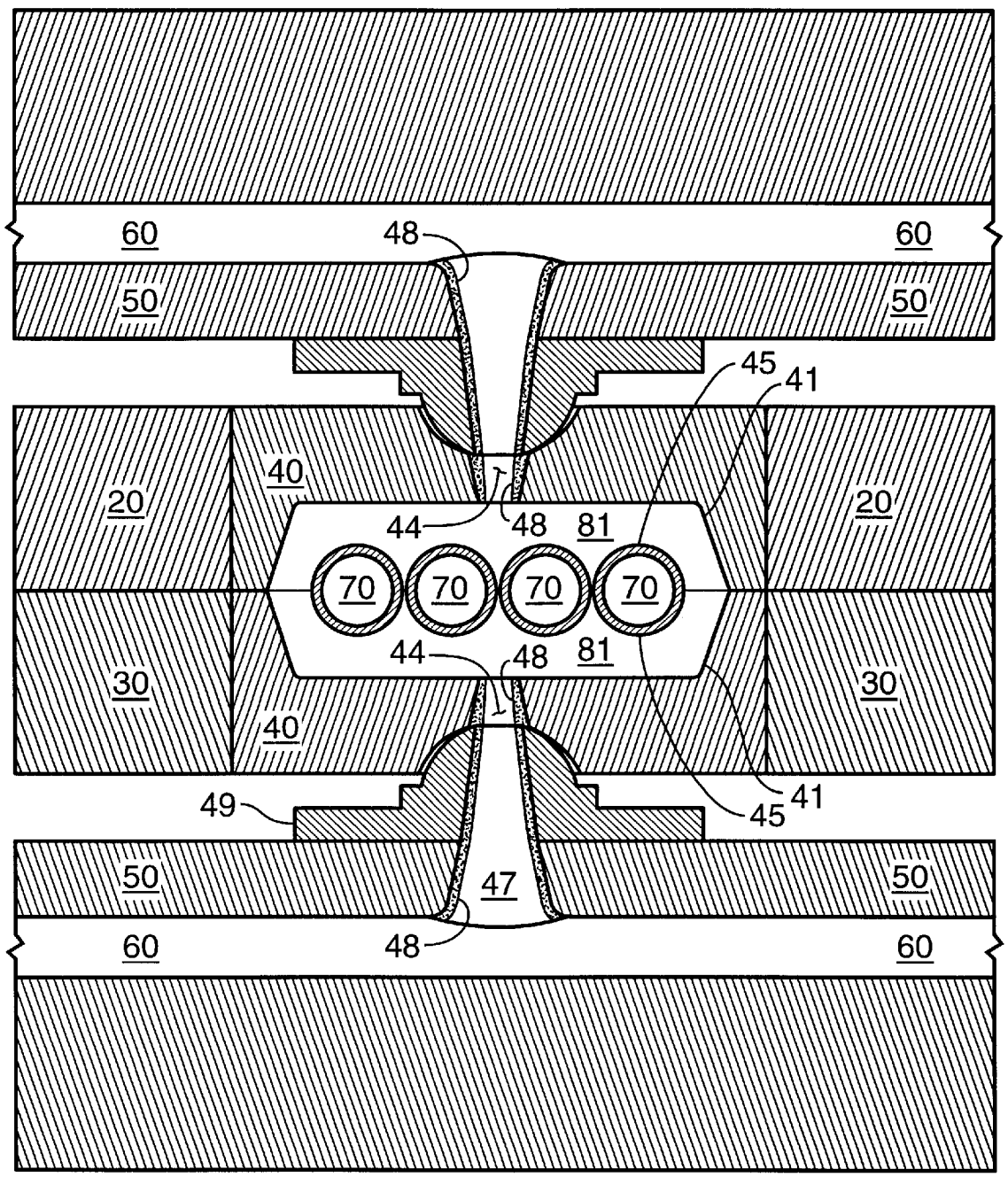
FIG. 14 is a side cross section of the adhesive injector for forming an adhesive band around the coils in conjunction with the top template and bottom template.

In another embodiment as shown in FIGS. 12–14 the adhesive can be formed into bands 81 around coils of tubing 70. The bands 81 are not as wide as tabs 80 in FIG. 1 since the bands 81 are securing the tubing 70 on the top, bottom and sides of the coil of tubing 70. The bands 81 may be even narrower than the tabs 80 which secure the coil of tubing 70 on both sides of the tubing as shown in FIGS. 7 and 8 because the adhesive now totally surrounds the coil of tubing 70. FIG. 14 shows how the adhesive injectors 40 in the top plate 20 and bottom plate 30 form the bands 81 of adhesive material around the coil of tubing 70 by expanding the adhesive tab cavity 42 of FIG. 11 to adhesive tab cavity 41 of FIG. 14 such that the adhesive flows around the coil of tubing 70.

Alternatively for the banding embodiments of FIG. 12–14 the adhesive material may be replaced by a plastic or other material which will surround and hold the tubing since the tubes are now surrounded by the material and are not held by the adhesive properties of the material.

Although FIG. 14 shows adhesive material being applied through top and bottom templates, since the adhesive tab cavity 41 surrounds the tubing only one injection template is needed, although it maybe better for even and faster distribution of the adhesive material to use two injection templates.

Figure 15:
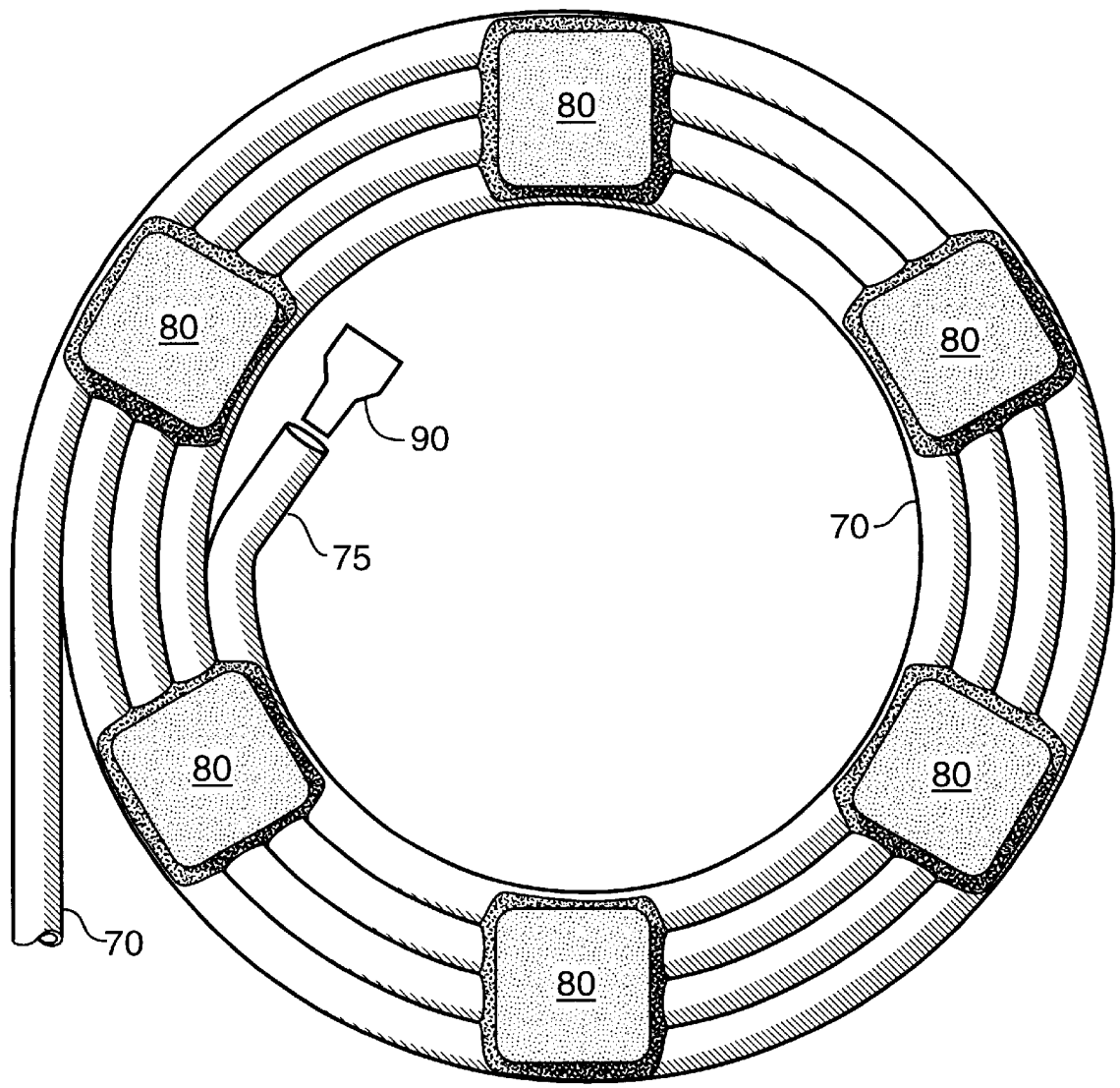
FIG. 15 is a bottom view of a tube coil having an angled portion on the inside diameter held together by adhesive tabs on one side of the coil.

In another embodiment shown in FIG. 15 it is desired to provide an angled portion 75 of the tube 70, which is bent at an angle toward the center of the coil to facilitate placing an object such as a lure 90 in the end of the tube 70.

Figure 16A:
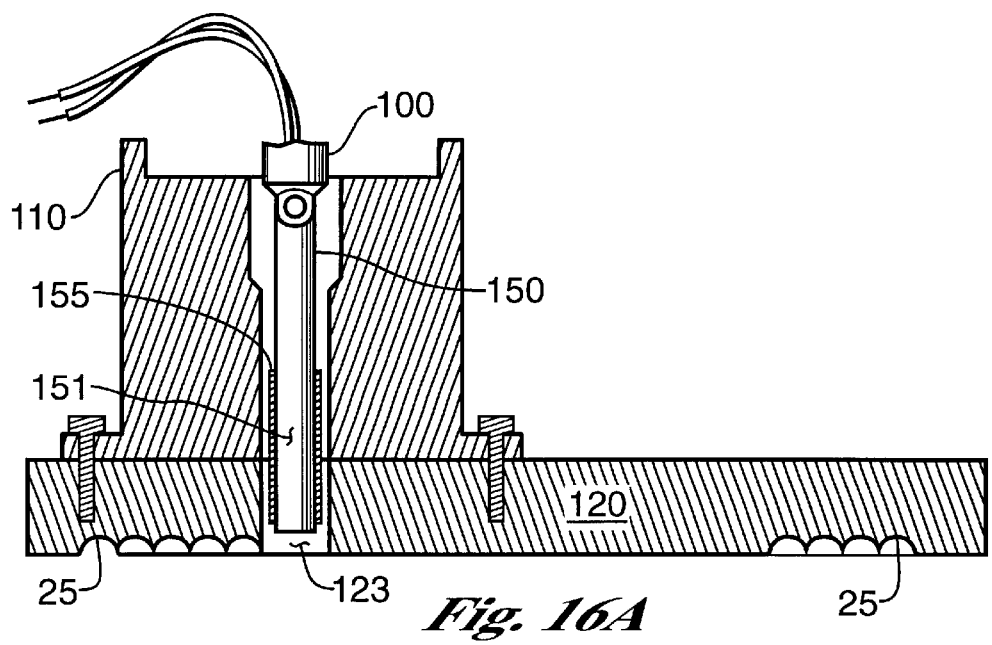
FIG. 16A is a cross sectional view of the top template of FIG. 15 showing a heating pin and an actuator therefore taken along line 7—7 of 16B.
Figure 16B:
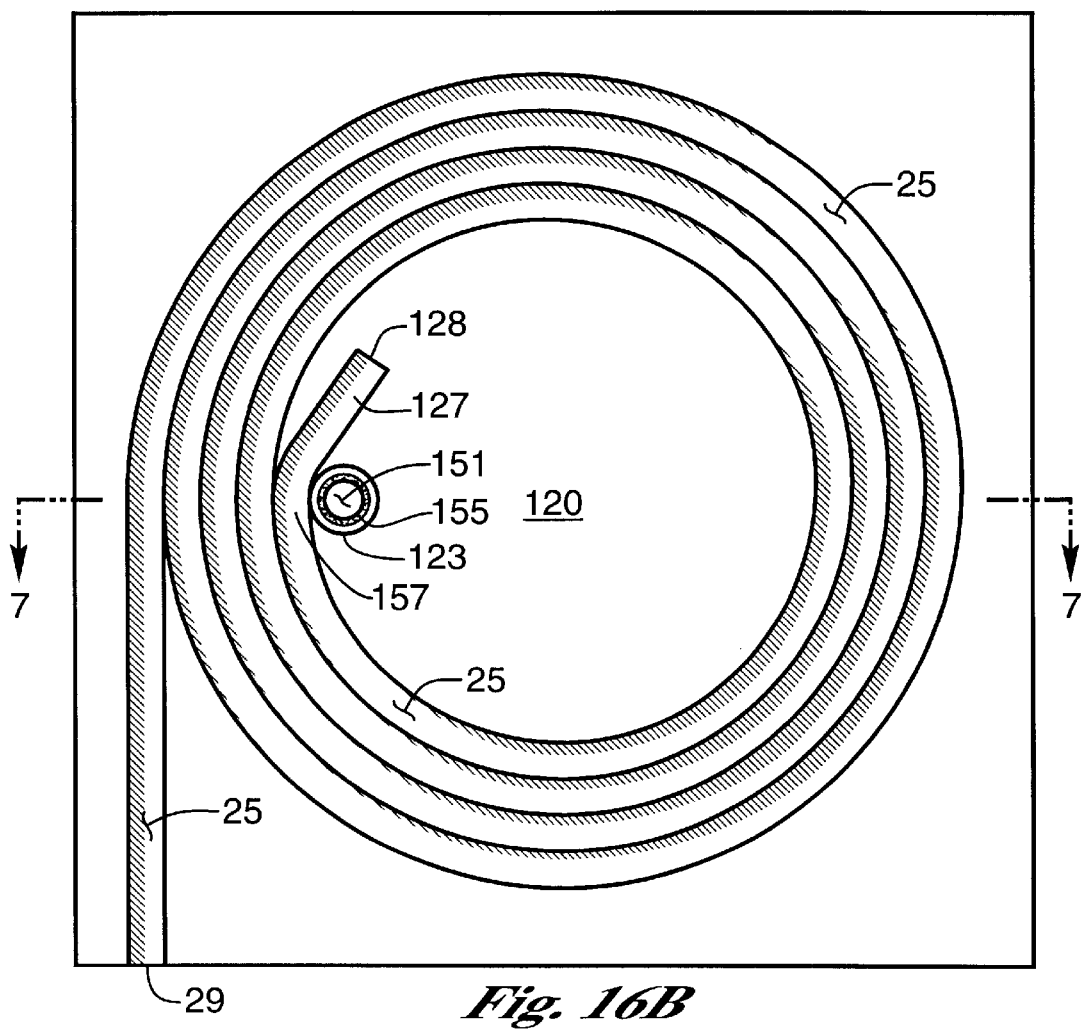
FIG. 16B is a plan view of the top template for the tube coil with an angled portion.
Figure 17A:
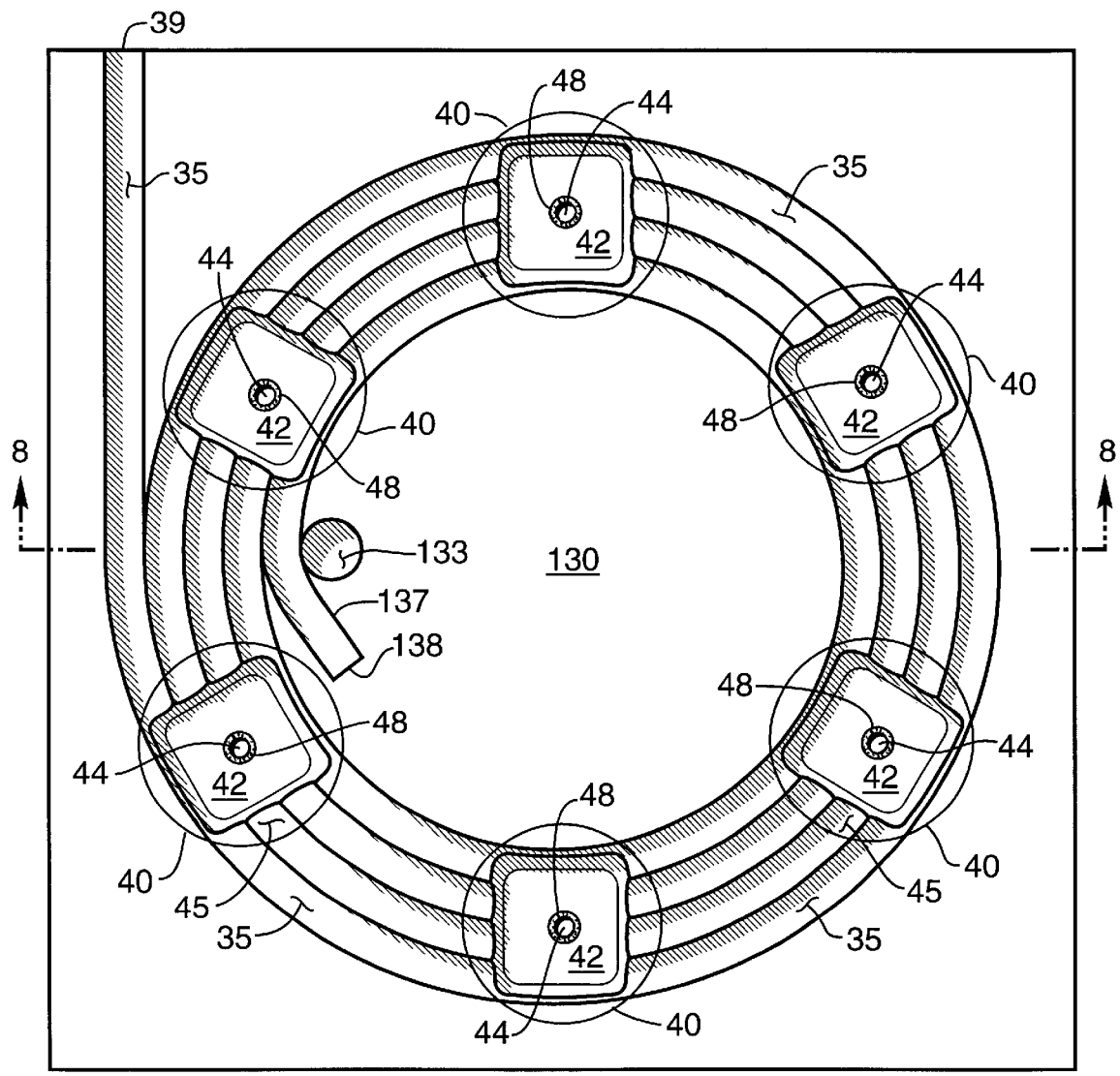
FIG. 17A is a plan view of the bottom template for the tube coil with an angled portion.
Figure 17B:
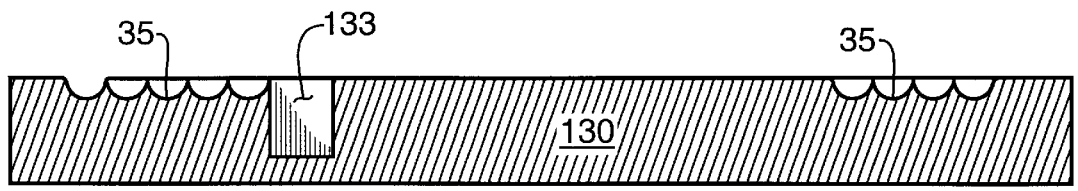
FIG. 17B is a cross sectional view of the bottom template for the tube coil with an angled portion do taken along line 8—8 of 17A.

In order to provide the angled portion 75 such that the tubing 70 retains its angled shape, a set of top and bottom plates 120 and 130 as shown in FIGS. 16A, 16B, and 17A, 17B are employed. FIG. 16A is a top cross sectional view of top plate 120 taken along line 7—7 of FIG. 16B. FIG. 17B is a top cross sectional view of bottom plate 130 taken along line 8—8 of FIG. 17A. The tube 70 is inserted into the spiral trough 25, 35 between partially opened plates 120 and 130 as before, however as the tube 70 reaches the end of the spiral trough 25, 35, the tube follows angled portion 127,137 until it is stopped at the end of the trough 128, 138. The plates 120 and 130 are then placed adjacent each other to firmly hold the tubing 70 for the application of adhesive tabs 80 as before. In order for the tubing to maintain its angled portion shape 75 after extraction form the plates 120, 130 the tubing 70 needs to be heated to relieve the stress at its bending point 157. When the tubing 70 cools it will then maintain its new angled configuration.

In order to heat the tubing 70 at its bending point 157 a pin 150 on an actuator 100 is placed in a housing 110 attached to the top template 120. When the templates 120 and 130 are adjacent and adhesive is being injected into adhesive tab cavities 42, pin 150 having a hot portion 151 is lowered through aperture 123 in top template 120 into aperture 133 in bottom template 130 by actuator 100 such that the hot portion 151 of pin 150 is adjacent tube 70. The plastic tubing 70 is heated on one side thereof to relieve the stress of bending. The plastic then cools in its angled position and will remain in that angled position after it is removed from the templates 120, 130.

The hot portion 151 of pin 150 should be adjacent one side of tube 70 for approximately 1 to 3 seconds. The hot portion 151 is preferably electrically heated to between 300 and 400 degrees Fahrenheit. The time and temperature varying depending on the type of tubing used.

The hot portion 151 of pin 150 is preferably positioned above template 120 before and after it heats tube 70, to keep template 120 cooler such that it acts as a heat sink for cooling the tube 70 after it is heat-treated.

The hot portion of pin 150 has an insulation material 155 on it such as Teflon® so that it guards against scorching of the tubing 70 and promotes movement of the pin 150 along the tubing 70 without excessive friction interfering with pin 150 motion.

Preferably the angled portion 75 of tube 70 is angled at approximately 15 degrees to facilitate attaching the lure 90.

The angled tubing can have a tab 80 on one side of the coil of tubing 70 as shown FIG. 2 in, beheld together by tabs 80 of adhesive on both sides of the coil of tubing 70 as in FIG. 8, or have bands 81 of adhesive as in FIG. 13.

Figure 18:
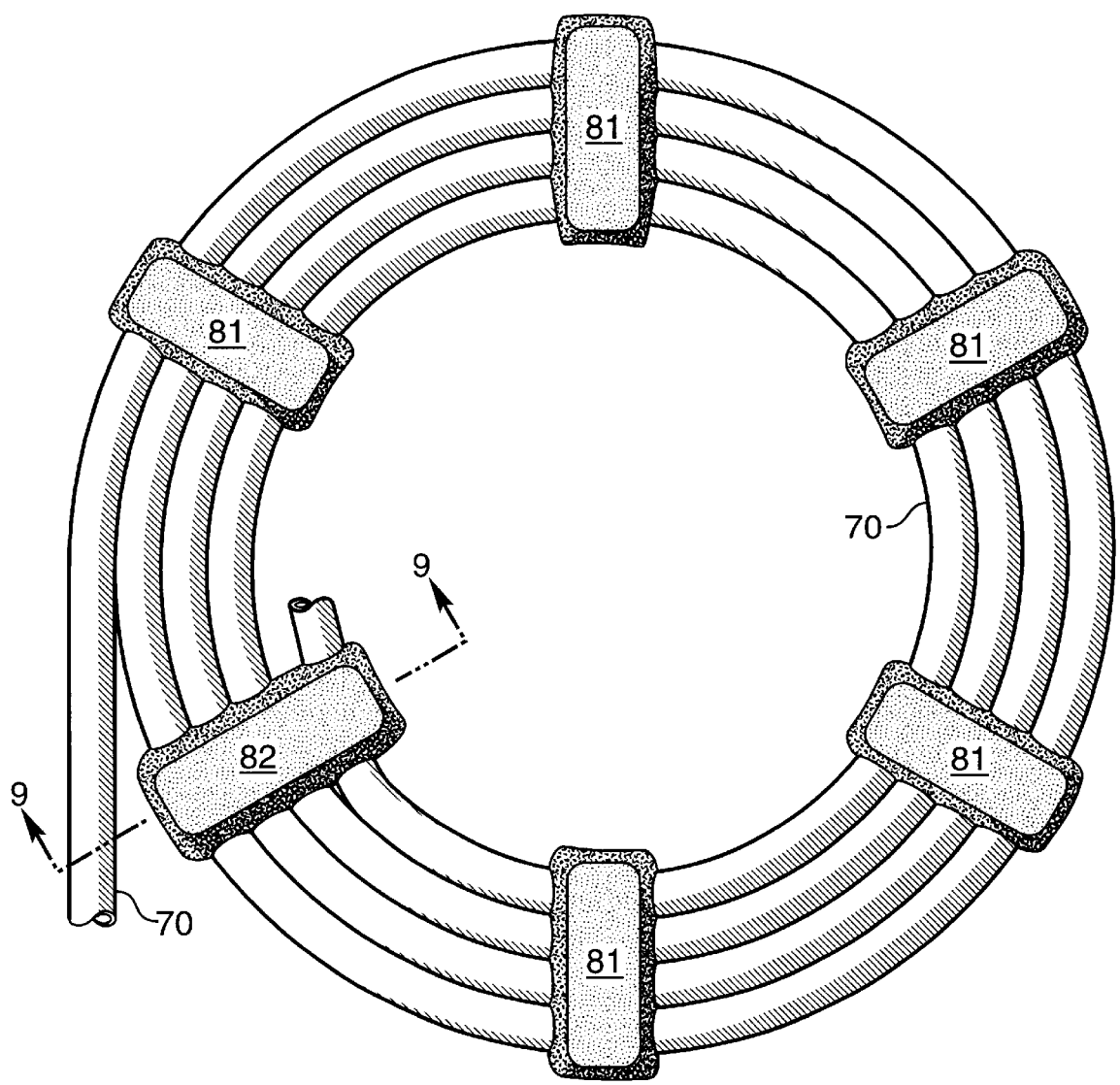
FIG. 18 is a bottom view of a tube coil having an angled portion on the inside diameter held together by adhesive bands around the coil and adhesive filling in between the angled portion and the coil.
Figure 19:
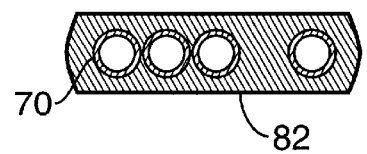
FIG. 19 is a cross section along 9—9 of FIG. 18 showing the angled portion of the tubing.
Figure 20A:
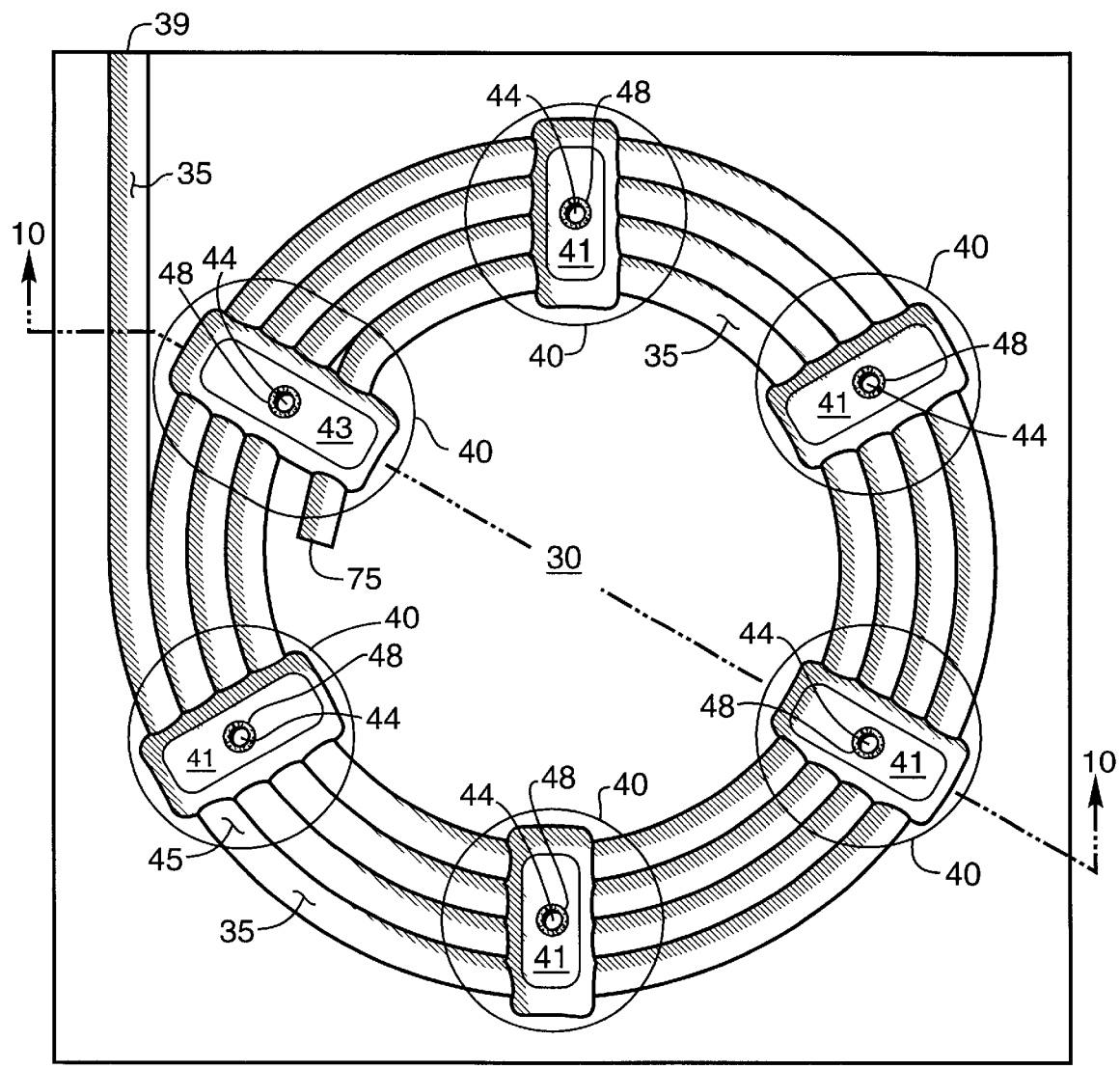
FIG. 20A is a plan view of the bottom template showing the angled portion of the tubing.
Figure 20B:
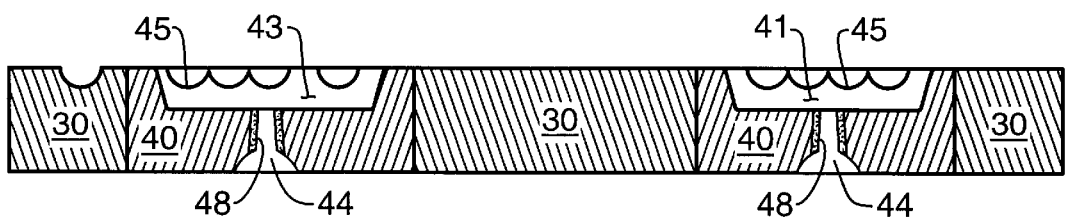
FIG. 20B is a cross sectional view of the bottom template taken along line 10—10 of FIG. 20A.

In an alternative embodiment as shown in FIGS. 18–21 the coil of tubing 70 angled portion 75 can be held in place without heat stressing the tubing 70 and thus eliminating the pin 150 and actuator 100 of FIG. 16A, by banding the angled portion 75 to the coiled tubing 70 and filling the volume therebetween with adhesive as shown in FIG. 18–19. In order to fill in the volume between the angled portion 75 and the coiled tubing 70 a modified adhesive tab cavity 42 is used. FIG. 20A and 20B show the bottom plate with adhesive band cavity 43 used on the portion of the coil with the angled portion 75 and band cavities 41 used on the remainder of the coiled tubing.

If the adhesive is of a type that is hot enough to heat treat the plastic tubing used in the coil then the angled tubing can be heat treated to relieve stress in the tubing caused by the angling. Otherwise the adhesive band and the adhesive filling the gap between the coil of tubing 70 and the angled portion 75 with keep the tubing in place.

Alternatively as above the banding 81 of the coiled tubing 70 may be replaced by tabs 80 on one or both sides of the coiled tubing 70.

Figure 21:
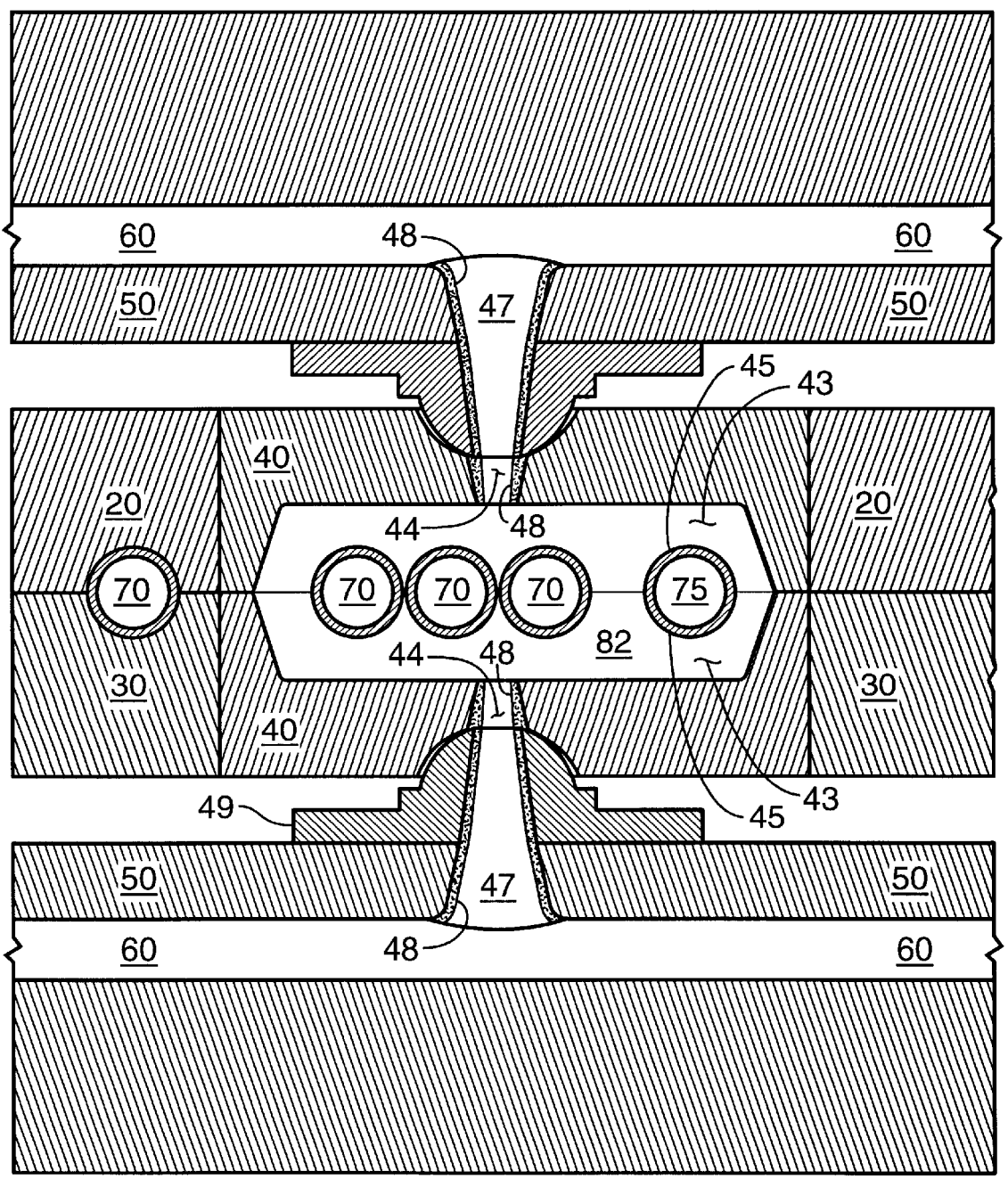
FIG. 21 is a side cross section of the adhesive injector for forming an adhesive band around the coils and filling in the space between the coil and the angled portion in conjunction with the top template and bottom template.

FIG. 21 shows adhesive added to the adhesive angled cavity 43 to hold the angled portion of tubing 75 in place with adhesive.

Figure 22:
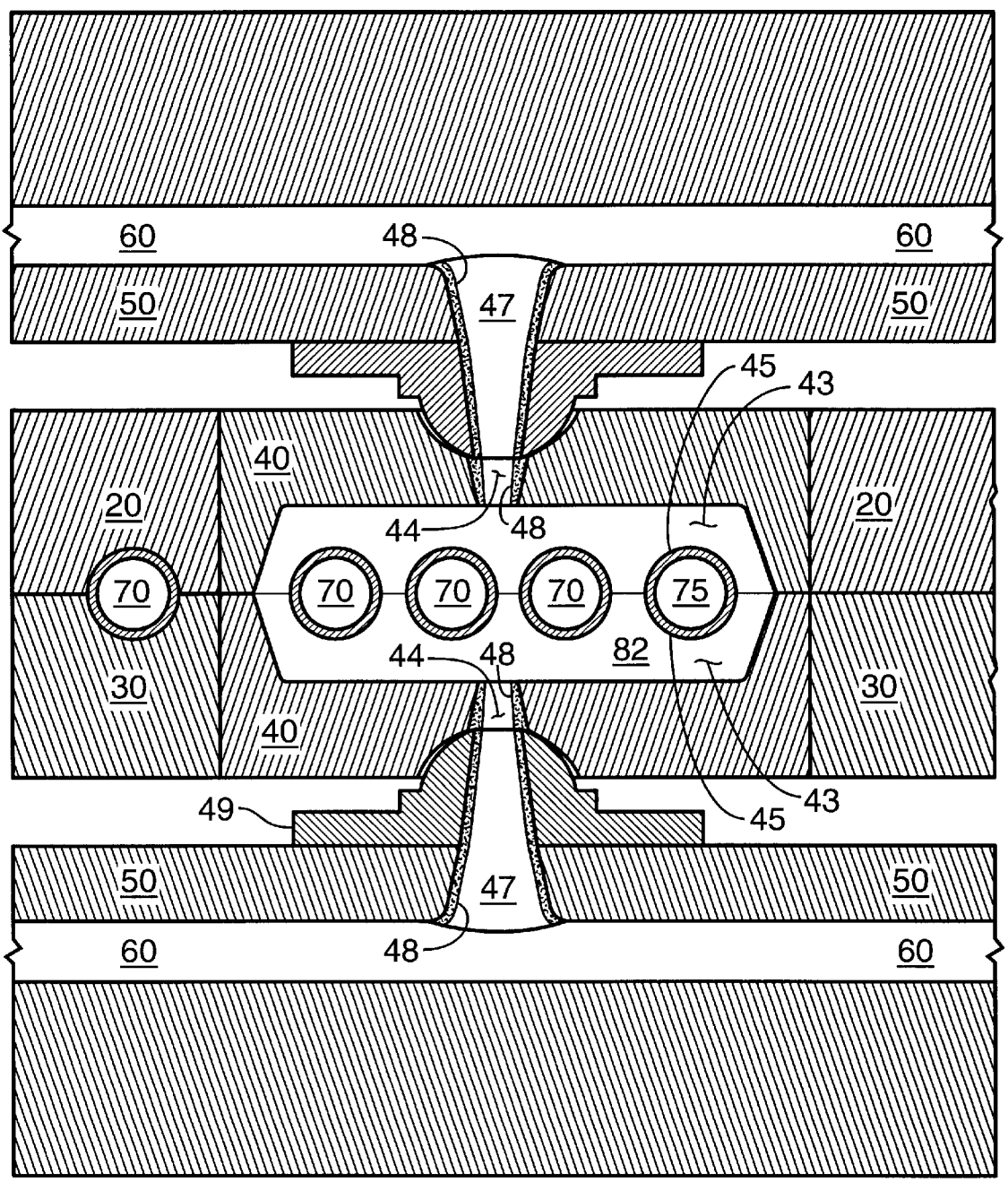
FIG. 22 is a side cross section as in FIG. 21 with the addition of filling in the space between the coil and the incoming tubing angled portion with adhesive to keep the tubing from angling outward when it is released from the template.

FIG. 22 shows incoming tubing to the coil held such that when it is removed from the template the incoming tubing does not uncoil from the configuration it was in while inside of the template. If the incoming portion of the tubing is not held at a point just prior to where it starts coiling on the coil it will spring out as it is removed from the template, unraveling until stopped by the first adhesive band or tab. The extended band including the incoming tube portion of tube 70 may be made by extending the adhesive band filler cavity 43 of FIG. 20A outward along line 10 to engulf the tube 70 in the straight portion of trough 35 just before it starts to be coiled.

Figure 23:
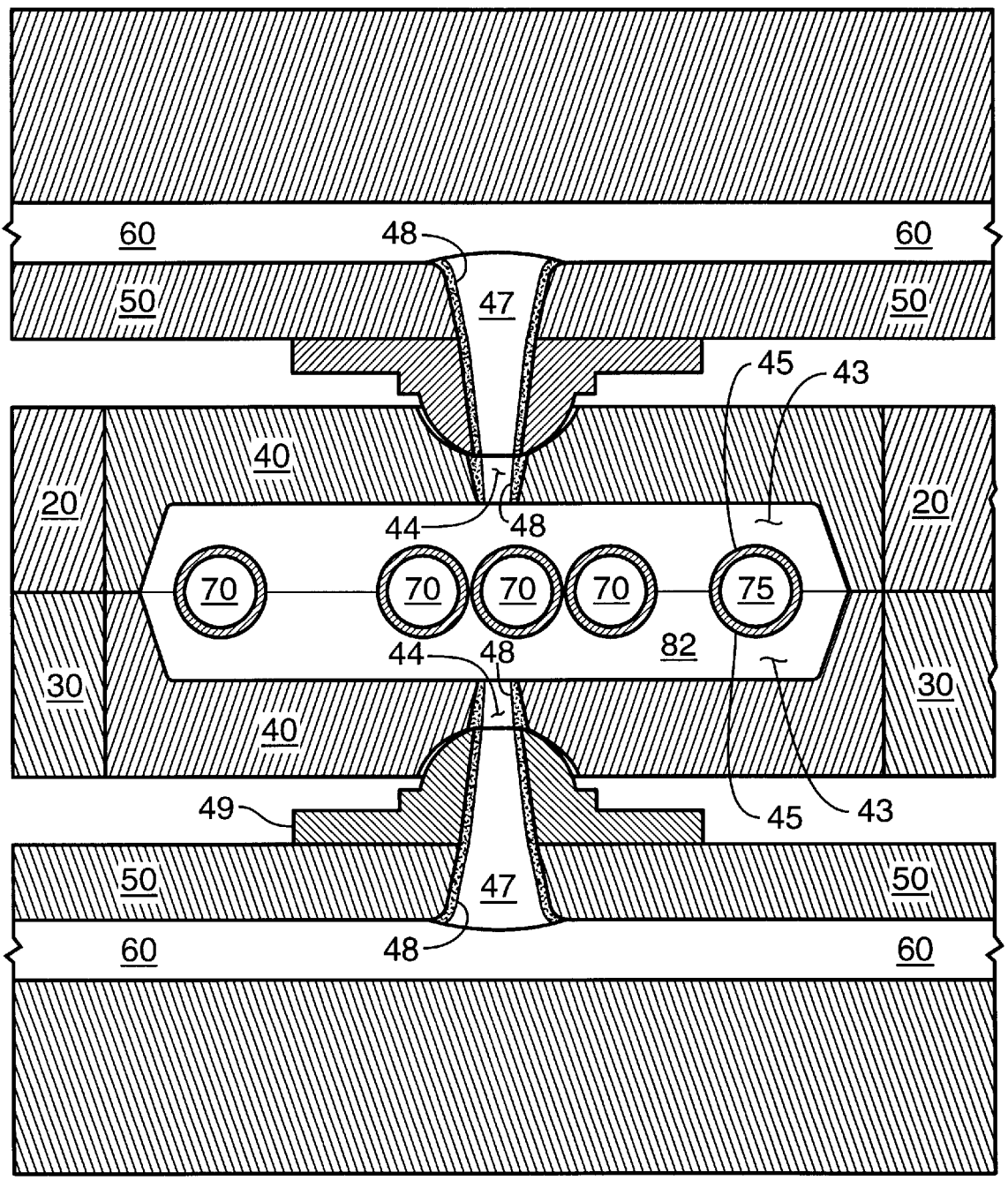
FIG. 23 is a side cross section of the adhesive injector with the tubing spaced apart such that adhesive can totally surround the tubing.

FIG. 23 shows an embodiment of the invention in which the tubing 70 in the coil is gapped such that adhesive can flow between the tubes 70 and form a bond all around each individual tube for a larger surface area of bonding of adhesive on the tubing and a stronger band. The gapped tubing may be totally surrounded by adhesive or alternatively a tab of adhesive as in FIGS. 1–6 may be applied between the tubes only on the top half of the tubing.

The invention contemplates any combination of gaps between the tubing, adjoining tubing, tabs on half the tubing, bands around the tubing, outer diameter angled portions in the band, inner diameter portion in the band, adhesive injectors on the top only, adhesive injectors on the bottom only, or adhesive injector on the top and bottom, heated adhesive or non heated adhesive, or using non adhesive material to band the tubes.

Obviously, many modifications and variations of the present invention are possible in light of the above teachings. It is therefore to be understood that, within the scope of the appended claims, the invention may be practiced otherwise than as specifically described.

What is claimed is:

1. A method of holding tubes in a coiled position comprising:

applying an adhesive material filling in a space running axially along at least one portion of the circumference of adjacent coiled tubes, the space filled beginning from a tangent line formed by the adjacent tubes in the coil, filling the space between the adjacent tubes on one side of the tangent line, and extending to a level above the adjacent tubes such that approximately one half of the volume between adjacent tubes has adhesive material binding the tubes together.

2. A method of holding tubes in a coiled position as in claim 1 comprising:

applying the adhesive material to fill the space between the tubes on the opposite side of the tangent line such that both sides of the coil have adhesive material securing the tubes in the coil.

3. A method of holding tubes in a coiled position as in claim 2 comprising:

applying the adhesive material to surround the coil of tubes forming a band of material around the coil of tubes.

4. A method of holding tubes in a coiled position as in claim 3 comprising:

coiling the tubing by longitudinally inserting the tubing between two templates held slightly apart for ease of inserting the tubing, the templates having mirror image coiled troughs for guiding the tubing into a coil, and then moving the templates adjacent each other to secure the tubing from movement before applying adhesive to bind the coiled tubes together and;

separating the templates for removing the coiled tubing from between the templates after the applied adhesive has secured the tubes in place.

5. A method of holding tubes in a coiled position as in claim 4 comprising:

angling a portion of the tubing on the inside diameter of the coil toward the axis of the coil by an angled trough portion at the end of the trough.

6. A method of holding tubes in a coiled position as in claim 5 comprising:

heat-treating the angled portion of the tubing to relieve stress in the tubing material and maintain the tubing in the angled portion shape.

7. A method of holding tubes in a coiled position as in claim 5 comprising:

filling in the space between the coiled tubing inner diameter and the angled portion of the tubing with adhesive material and surrounding a portion of the angled portion with the adhesive material to secure the coiled tubing and the angled portion of the tubing.

8. A method of holding tubes in a coiled position as in claim 4 comprising:

filling in the space between the coiled tubing outer diameter and the straight portion of tubing before it is coiled and surrounding a portion of the straight portion of tubing with the adhesive material to secure the coiled tubing and the straight portion of tubing.

9. A method of holding tubes in a coiled position as in claim 7 comprising:

filling in the space between the coiled tubing outer diameter and the straight portion of tubing before it is coiled and surrounding a portion of the straight portion of tubing with the adhesive material to secure the coiled tubing and the straight portion of tubing.

10. A method of holding tubes in a coiled position as in claim 1 comprising:

coiling the tubing by longitudinally inserting the tubing between two templates held slightly apart for ease of inserting the tubing, the templates having mirror image coiled troughs for guiding the tubing into a coil, and then moving the templates adjacent each other to secure the tubing from movement before applying the adhesive material to bind the coiled tubes together and;

seperating the temples for removing the coiled tubing from between the templates after the applied adhesive has secured the tubes in place.

11. A method of holding tubes in a coiled position as in claim 8 comprising:

angling a portion of the tubing on the inside diameter of the coil toward the axis of the coil by an angled trough portion at the end of the trough.

12. A method of holding tubes in a coiled position as in claim 11 comprising:

heat-treating the angled portion of the tubing to relieve stress in the tubing material and maintain the tubing in the angled portion shape.

13. A method of holding tubes in a coiled position as in claim 2 comprising:

coiling the tubing by longitudinally inserting the tubing between two templates held slightly apart for ease of inserting the tubing, the templates having mirror image coiled troughs for guiding the tubing into a coil, and then moving the templates adjacent each other to secure the tubing from movement before applying adhesive to bind the coiled tubes together and;

separating the templates for removing the coiled tubing from between the templates after the applied adhesive has secured the tubes in place.

14. A method of holding tubes in a coiled position as in claim 13 comprising:

angling a portion of the tubing on the inside diameter of the coil toward the axis of the coil by an angled trough portion at the end of the trough.

15. A method of holding tubes in a coiled position as in claim 14 comprising:

heat-treating the angled portion of the tubing to relieve stress in the tubing material and maintain the tubing in the angled portion shape.

16. A method of holding tubes in a coiled position comprising:

applying a material filling in a space running axially along at least one portion of the circumference of adjacent coiled tubes, the space filled beginning from a tangent line formed by adjacent tubes in the coil, filling the space between the tubes on both sides of the tangent line, and extending to a level above and below the adjacent tubes and on the sides of the coil to beyond the inner and outer diameter of the coil such that the tubes are totally encased in the material except at the tangent line of the adjacent tubes.

17. A method of holding tubes in a coiled position as in claim 16 wherein:

the material applied is an adhesive material.

18. A method of holding tubes in a coiled position as in claim 16 comprising:

coiling the tubing by longitudinally inserting the tubing between two templates held slightly apart for ease of inserting the tubing, the templates having mirror image coiled troughs for guiding the tubing into a coil, and then moving the templates adjacent each other to secure the tubing from movement before applying material to bind the coiled tubes together and;

separating the templates for removing the coiled tubing from between the templates after the applied material has secured the tubes in place.

19. A method of holding tubes in a coiled position as in claim 18 comprising:

angling a portion of the tubing on the inside diameter of the coil toward the axis of the coil by an angled trough portion at the end of the trough.

20. A method of holding tubes in a coiled position as in claim 19 comprising:

heat-treating the angled portion of the tubing to relieve stress in the tubing material and maintain the tubing in the angled portion shape.

21. A method of holding tubes in a coiled position as in claim 19 comprising:

filling in the space between the coiled tubing inner diameter and the angled portion of the tubing with material and surrounding a portion of the angled portion with the material to secure the coiled tubing and the angled portion of the tubing.

22. A method of holding tubes in a coiled position as in claim 18 comprising:

filling in the space between the coiled tubing outer diameter and the straight portion of tubing before it is coiled and surrounding a portion of the straight portion of tubing with the material to secure the coiled tubing and the straight portion of tubing.

23. A method of holding tubes in a coiled position as in claim 21 comprising:

filling in the space between the coiled tubing outer diameter and the straight portion of tubing before it is coiled and surrounding a portion of the straight portion of tubing with the material to secure the coiled tubing and the straight portion of tubing.

24. A method of holding tubes in a coiled position comprising:

applying a material filling in a space running axially along at least one portion of the circumference of the coiled tubes having a space between the tubes, filling the space between the tubes, and extending to a level above and below the tubes and on the sides of the coil to beyond the inner and outer diameter of the coil such that the tubes are totally encased in the material.

25. A method of holding tubes in a coiled position as in claim 24 wherein:

the material applied is an adhesive material.

26. A method of holding tubes in a coiled position as in claim 24 comprising:

coiling the tubing by longitudinally inserting the tubing between two templates held slightly apart for ease of inserting the tubing, the templates having mirror image coiled troughs for guiding the tubing into a coil, and then moving the templates adjacent each other to secure the tubing from movement before applying material to bind the coiled tubes together and;

separating the templates for removing the coiled tubing from between the templates after the applied material has secured the tubes in place.

27. A method of holding tubes in a coiled position as in claim 26 comprising:

angling a portion of the tubing on the inside diameter of the coil toward the axis of the coil by an angled trough portion at the end of the trough.

28. A method of holding tubes in a coiled position as in claim 27 comprising:

heat-treating the angled portion of the tubing to relieve stress in the tubing material and maintain the tubing in the angled portion shape.

29. A method of holding tubes in a coiled position as in claim 27 comprising:

filling in the space between the coiled tubing inner diameter and the angled portion of the tubing with adhesive material and surrounding a portion of the angled portion with the adhesive material to secure the coiled tubing and the angled portion of the tubing.

30. A method of holding tubes in a coiled position as in claim 27 comprising:

filling in the space between the coiled tubing outer diameter and the straight portion of tubing before it is coiled and surrounding a portion of the straight portion of tubing with the adhesive material to secure the coiled tubing and the straight portion of tubing.

31. A method of holding tubes in a coiled position as in claim 29 comprising:

filling in the space between the coiled tubing outer diameter and the straight portion of tubing before it is coiled and surrounding a portion of the straight portion of tubing with the adhesive material to secure the coiled tubing and the straight portion of tubing.

* * * * *